US007605849B1

(12) United States Patent
Hatanaka

(10) Patent No.: US 7,605,849 B1
(45) Date of Patent: Oct. 20, 2009

(54) METHOD AND APPARATUS FOR IMAGE TRANSFER PROCESSING ACCORDING TO TRANSFER HISTORY

(75) Inventor: Koji Hatanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 09/630,798

(22) Filed: Aug. 2, 2000

(30) Foreign Application Priority Data

Aug. 27, 1999 (JP) .................................. 11-241366

(51) Int. Cl.
*H04N 5/232* (2006.01)
*H04N 5/225* (2006.01)
*H04N 5/76* (2006.01)
*G06F 15/16* (2006.01)

(52) U.S. Cl. ............... 348/231.2; 348/207.1; 348/211.3; 709/211

(58) Field of Classification Search ................. 709/231, 709/211; 382/305–307; 707/104.1, 204; 358/401, 403, 452; 348/231.2–231.9, 231.99, 348/207.1, 211.4, 207.11, 211.3
See application file for complete search history.

(56) References Cited

U.S. PATENT DOCUMENTS

| | | | | |
|---|---|---|---|---|
| 5,706,457 A * | 1/1998 | Dwyer et al. | ................ | 345/835 |
| 6,058,399 A * | 5/2000 | Morag et al. | ................ | 707/201 |
| 6,092,023 A * | 7/2000 | Kunishige | ....................... | 702/1 |
| 6,154,779 A * | 11/2000 | Otani et al. | .................. | 709/232 |
| 6,199,073 B1* | 3/2001 | Peairs et al. | ................. | 707/204 |
| 6,256,059 B1* | 7/2001 | Fichtner | .......................... | 710/8 |
| 6,337,712 B1* | 1/2002 | Shiota et al. | ............. | 348/231.1 |
| 6,445,460 B1* | 9/2002 | Pavley | ........................ | 358/1.15 |
| 6,469,689 B1* | 10/2002 | Dow et al. | ................... | 345/156 |
| 6,507,363 B1* | 1/2003 | Anderson et al. | ......... | 348/231.9 |
| 6,571,245 B2* | 5/2003 | Huang et al. | ................... | 707/10 |
| 6,583,799 B1* | 6/2003 | Manolis et al. | ............. | 345/838 |
| 6,615,241 B1* | 9/2003 | Miller et al. | ................. | 709/206 |
| 6,668,134 B1* | 12/2003 | Niikawa | ....................... | 386/95 |
| 6,784,924 B2* | 8/2004 | Ward et al. | ............... | 348/207.1 |
| 6,930,709 B1* | 8/2005 | Creamer et al. | .......... | 348/211.3 |
| 7,117,519 B1* | 10/2006 | Anderson et al. | ........... | 725/105 |
| 7,161,618 B1* | 1/2007 | Niikawa et al. | .......... | 348/207.1 |
| 7,248,290 B2* | 7/2007 | Shioji | ....................... | 348/231.2 |
| 7,287,088 B1* | 10/2007 | Anderson | .................... | 709/235 |
| 2003/0072486 A1* | 4/2003 | Loui et al. | .................. | 382/175 |

FOREIGN PATENT DOCUMENTS

| | | |
|---|---|---|
| JP | 9-116657 | 5/1997 |
| JP | 9-200668 | 7/1997 |
| JP | 10-150523 | 6/1998 |
| JP | 10-336574 | 12/1998 |

* cited by examiner

*Primary Examiner*—Ario Etienne
*Assistant Examiner*—Gregory G Todd
(74) *Attorney, Agent, or Firm*—Fitzpatrick, Cella, Harper & Scinto

(57) ABSTRACT

Transfer history information of images to other apparatus is read out from a storing medium, reference is made to the transfer history information at the time of transferring images to other apparatuses or capturing images from other apparatuses, and images not transferred to other apparatus can be transferred or captured in batch fashion, thereby solving the problem in the conventionally-known art for displaying or recognizing transferred images, in that selecting all images not transferred yet at the time of making selection of the images to be transferred on a display screen has been extremely troublesome in the event that the number of images to select is great and that this increases with the number of images.

24 Claims, 20 Drawing Sheets

METHOD AND APPARATUS FOR IMAGE TRANSFER PROCESSING ACCORDING TO TRANSFER HISTORY

BACKGROUND OF THE INVENTION

1. Field of the Invention

The present invention relates to an image processing apparatus, image processing method, and storing medium for transferring or capturing images stored in a recording medium.

2. Description of the Related Art

Hitherto, there have been systems for transferring and saving images recorded by image recording apparatuses such as digital cameras and the like to image storing managing apparatuses capable of storing and managing images such as PCs or the like.

However, the above conventional art has problems such as the following.

Even in the event that the image stored in the storing medium is transferred to the apparatus for managing and storing the image, normally, the image remains on the storing medium.

However, in the event that the user forgets that the image for has been transferred to the apparatus for managing and storing the image, and transfers the image again at a later time, the same image may be doubly managed by the apparatus for managing and storing the image.

Also, judgement of whether an image has been transferred or not has been conventionally performed by using attribute information of files such as archive information, but selecting all images not transferred yet at the time of making selection of the image to be transferred on a display screen is extremely troublesome in the event that the number of images to select is great, and this increases with the number of images.

SUMMARY OF THE INVENTION

Accordingly, it is an object of the present invention to solve all, or at least one, of the above problems.

Also, another object of the present invention is to provide an image processing apparatus, an image processing method, and a storing medium, whereby images not transferred can be transferred or captured while preventing multiple transfers of the same image, in manner handy to the user.

To this end, an image transferring apparatus is provided, comprising a storage unit, adapted to store image data, a display unit, adapted to display a screen to enable a user to select between (1) transferring only image data stored in the storage unit which has not previously been transferred and (2) transferring all image data stored in the storage unit, and an image data transfer instruction unit adapted to enable a user to enter an instruction to transfer the image data. The apparatus also comprises a transfer control unit, adapted to perform control to transfer the image data in response to an instruction to transfer entered by the user with the image data transfer instruction unit, and to judge a selection selected from the screen displayed by the display unit. If the selection to transfer only image data not previously transferred is made, the transfer control unit performs control to transfer only the image data not previously transferred based on transfer history information, and, if the selection to transfer all image data stored in the storage unit is made, the unit performs control to transfer all the image data stored in the storage unit regardless of the transfer history information.

A further aspect of the present invention is an image transferring apparatus comprising a storage unit, adapted to store image data, a transfer unit, adapted to transfer image data stored in the storage unit, a button, to instruct the image data, and a changing unit, adapted to change transfer history information to a transferred status in the event that the transfer history information of the image data previously transferred by the transfer unit indicates that the image has not been transferred.

Yet another aspect of the present invention provides an image processing apparatus, comprising a capturing unit adapted to capture a plurality of bodies of reduced image data, each corresponding to a respective image, from a storage medium of at least one external device. A display control unit is adapted to perform control so as to display the reduced image data captured by the capturing unit, and a screen display control unit is adapted to perform control so as to display a screen to enable a user to select between (1) selecting only image data stored in the storage unit which has not previously been transferred and (2) selecting all image data stored in the storage medium. The screen display control unit is adapted to control so as to display, selectively, in response to a selection made by the user with the screen display control unit, either (1) only the image(s) not previously been transferred or (2) all image(s) stored in the storage medium.

Further objects, features and advantages of the present invention will become apparent from the following description of the preferred embodiments, with reference to the attached drawings.

DESCRIPTION OF THE PREFERRED EMBODIMENTS

First Embodiment

Figure 1:
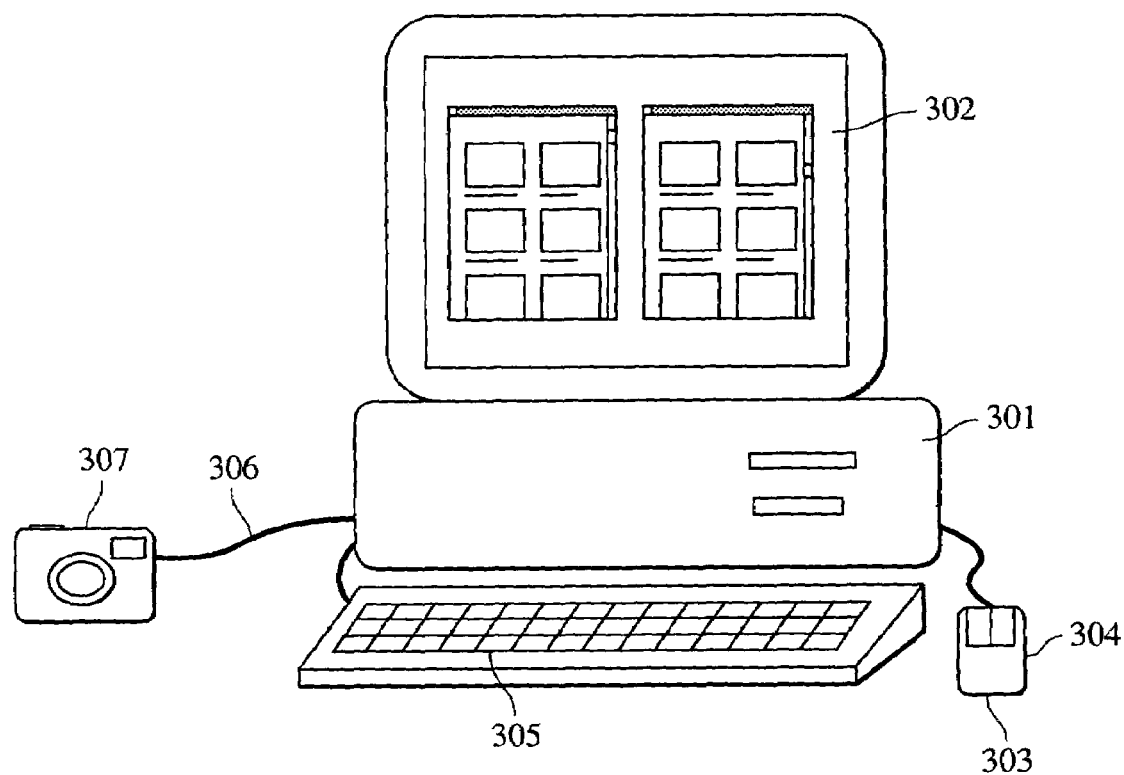
FIG. 1 is a diagram showing the equipment configuration of a first embodiment.

FIG. 1 shows a configuration example of a digital camera system including a computer which serves as a platform upon which the present invention can be carried out. In FIG. 1, reference numeral 301 denotes a computer system (PC) main unit, 302 denotes a display for displaying data, 303 denotes a mouse which is a representative pointing device, 304 denotes a mouse button and 305 denotes a keyboard.

Further, reference numeral 307 denotes a digital camera capable of being connected to the computer system, and this is connected via a general-purpose interface capable of transferring data, such as the USB (Universal Serial Bus) 306 or the like.

Figure 2:
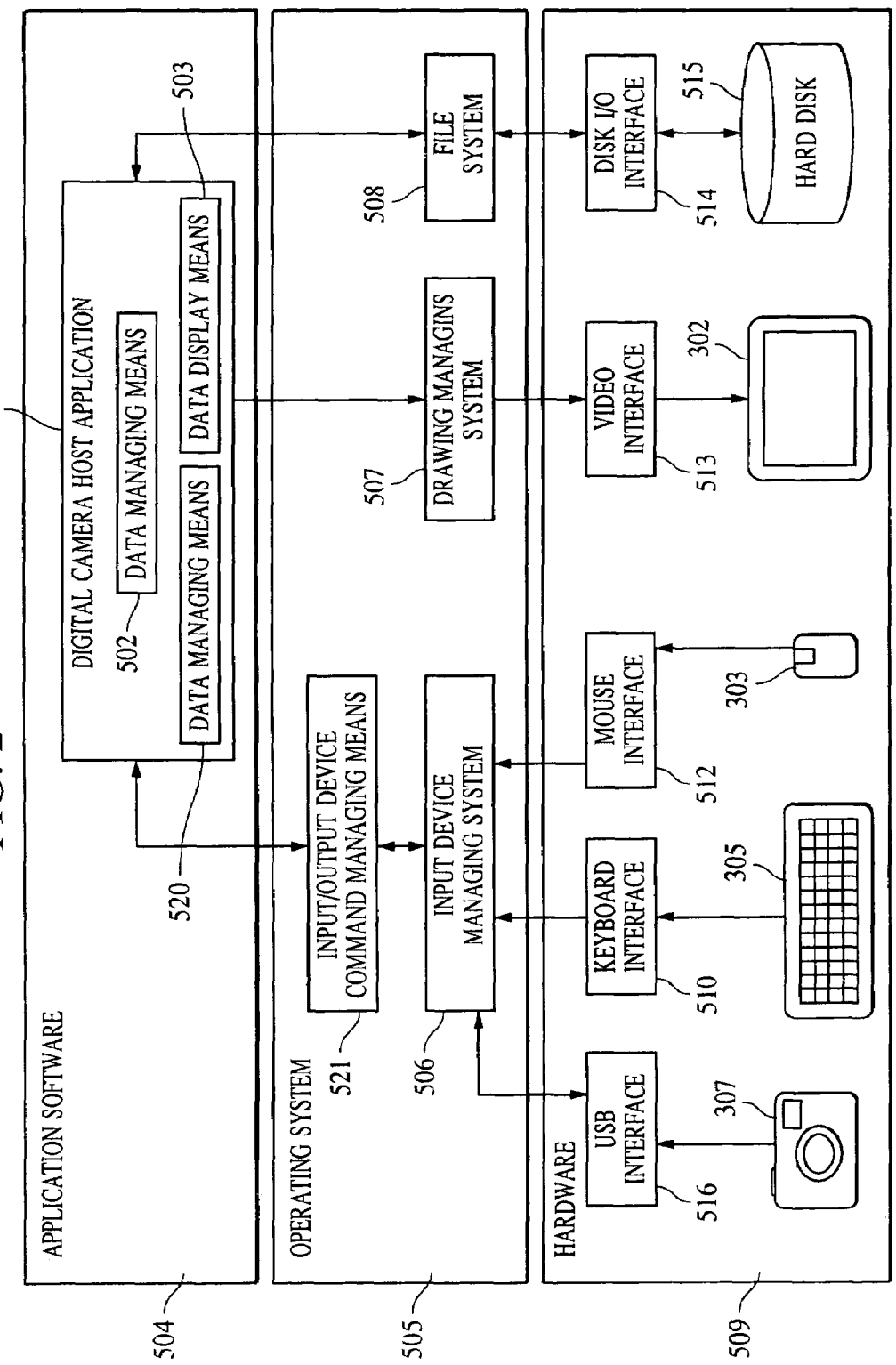
FIG. 2 is a system block diagram of the first embodiment.

FIG. 2 is a diagram illustrating the configuration of a digital camera system including the software and hardware of the computer whereby the present invention can be carried out. In FIG. 2, reference numeral 509 denotes hardware, 505 denotes an operating system which operates on the hardware 509, and 504 denotes application software which runs on the operating system 505.

Note that in this Figure, blocks which are necessary as a matter of course as components making up the hardware 509 and software 505 but are not directly necessary for describing the embodiments of the present invention are not shown.

Examples of such blocks not shown in the Figure include the CPU and memory for hardware, the memory managing system for the operating system, and so forth.

In FIG. 2, reference numeral 515 denotes a hard disk for storing files and data, and 508 denotes a file system making up the operating system, having functions for allowing input and output of files to be performed without the application software directly controlling the hardware.

Reference numeral 514 denotes a disk I/O interface for the file system 508 to read from and write to the hard disk 515.

Reference numeral 507 denotes a drawing management system making up the operating system, having functions for allowing drawing to be performed without the application system directly controlling the hardware.

Reference numeral 513 denotes a video interface for the drawing management system 507 to perform drawing on the display 302.

Reference numeral 506 denotes a input device managing system making up the operating system, having functions for allowing user input to be received without the application software directly controlling the hardware.

The USB host system serving as the host in the event of using USB equipment is also included here.

Reference numeral 510 denotes a keyboard interface for the input device managing system 506 to receive input from the keyboard 305, and reference numeral 512 denotes a mouse interface 512 for the input device managing system 506 to receive input from the mouse 303.

Further, the digital camera 307 is connected to the USB interface 516, and can exchange image data and the like via the input device management system 510.

Reference numeral 501 denotes a digital camera host application for managing and storing images, and 502 denotes data managing means for managing means using such as the date of creating the image data, date of photography, keyword, and so forth.

Reference numeral 503 denotes data displaying means for displaying the managed image data.

Reference numeral 520 denotes data registering means for automatically judging the attributes of data being registered anew, and registering the data.

With the present system, data transfer is performed with the digital camera by the digital camera host application 501. The transferred image data is stored in the hard disk 515 of the PC by the data managing means 502.

The input/output device command monitoring system 521 monitors commands issued from external devices such as the camera, and performs processes set beforehand by various types of commands.

Figure 3:
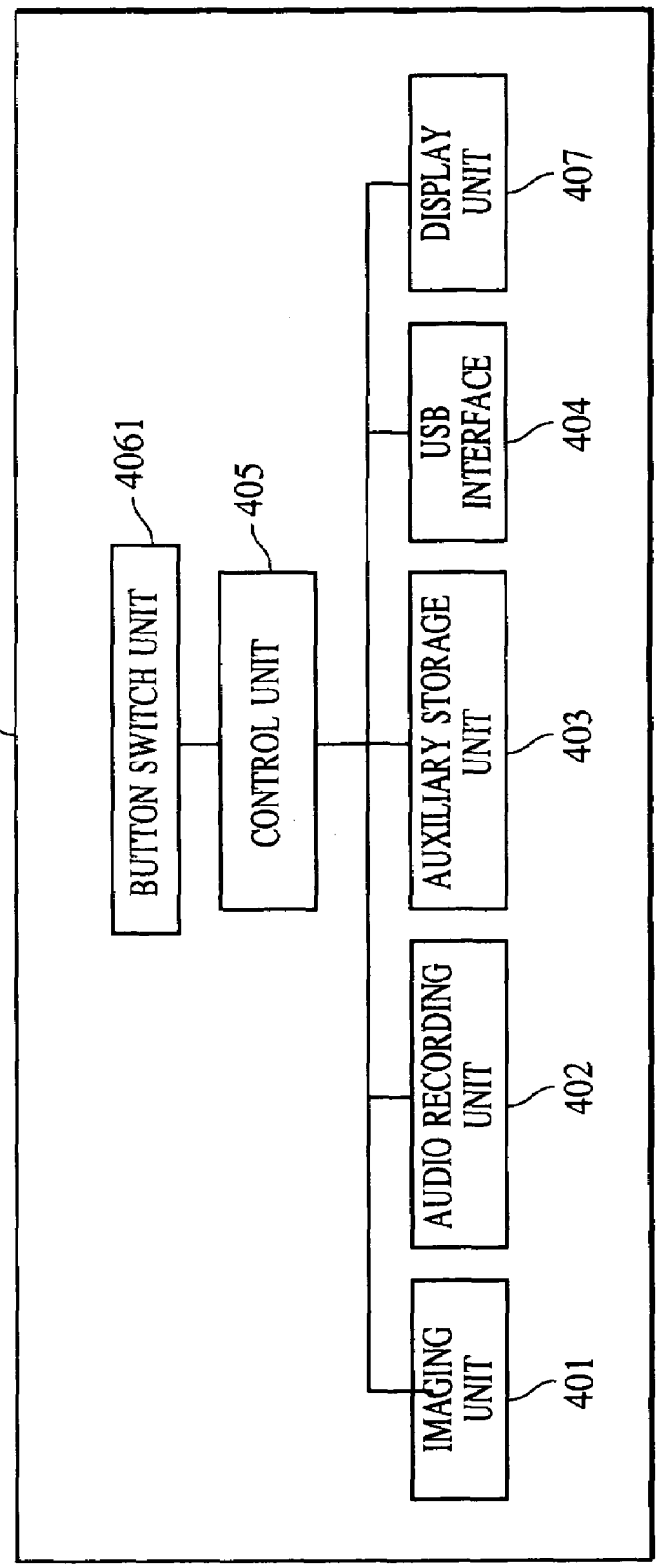
FIG. 3 is a system block diagram of a digital camera according to the first embodiment.
Figure 4:
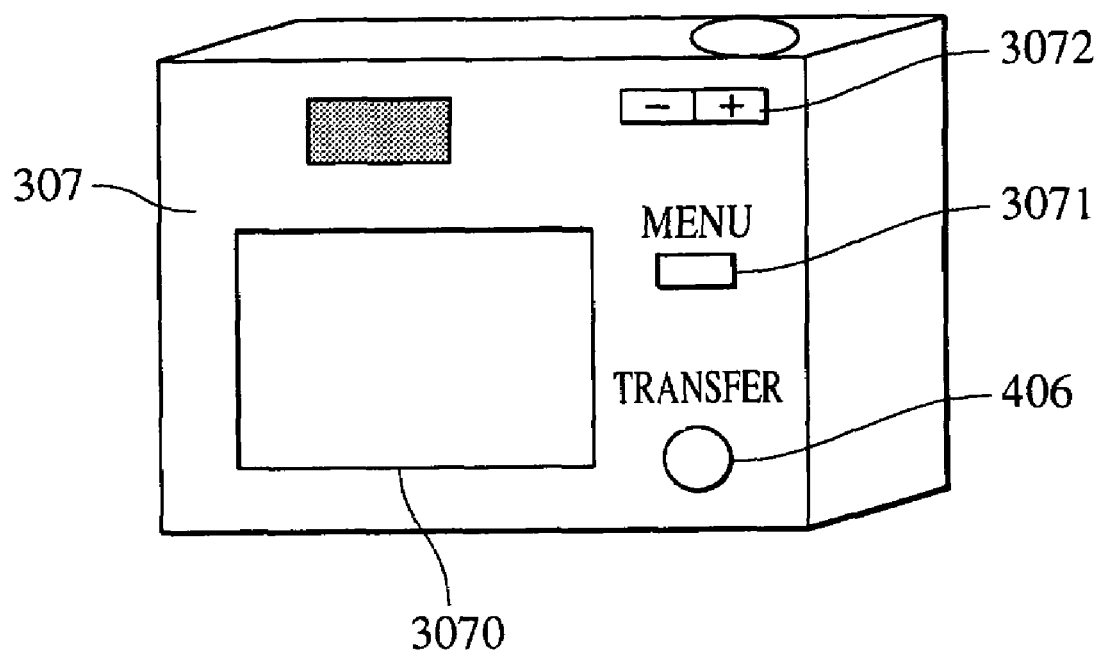
FIG. 4 is an external view of the digital camera according to the first embodiment.

FIG. 3 shows a block diagram of the configuration of the digital camera 307 according to the embodiment of the present invention, and FIG. 4 shows an external view of the digital camera 307.

Note that in FIG. 3, blocks which are necessary as a matter of course as components but are not directly necessary for describing the embodiments of the present invention are not shown.

In FIG. 3, an imaging unit 401 includes lenses and CCDs, and outputs the photographed image as image data (JPEG data). Also, the imaging unit 401 also creates thumbnail image data, i.e., reduced images of the photographed images, at the same time.

With the digital camera according to the present system, audio can be recorded in addition to taking images, and the audio is output as recorded data (WAVE format data) from the recording unit 402.

The auxiliary storing device 403 is for saving the data from the imaging unit 401 and the recording unit 402 as files, and the present system uses a compact flash memory card as a detachable recording medium.

Reference numeral 404 denotes an interface for connecting the digital camera and the computer, which is an general-use interface the same as 306, and is connected to the USB port shown in FIG. 2.

The control unit 405 is for controlling the operation of the overall digital camera 307. Changes to file contents with the present invention and so forth are performed here.

Reference numeral 4061 denotes a button switch unit, for transferring the input from the various buttons shown in the external view of FIG. 4, to the control unit 405.

In FIG. 4, reference numeral 3071 denotes a menu button, and pressing this button causes a menu to be displayed on the liquid crystal display screen 3070 for performing various settings for the camera.

The user can change the settings for the digital camera 307 by operating the operating buttons 3072.

The digital camera according to the embodiment of the present invention has functions for automatically transferring images from the digital camera to the host PC, and the transfer button 406 is used at the time of performing auto-transfer.

Reference numeral 407 denotes a display unit, for displaying image data from the imaging unit on the liquid crystal display screen 3070 of the digital camera, and also menus for performing settings for the digital camera.

First, a first embodiment according to the present invention, for managing file transfer history of the images will be described.

With the first embodiment, a field is provided within each image file, for storing information regarding whether or not that file itself has been transferred to the host PC.

Figure 5:
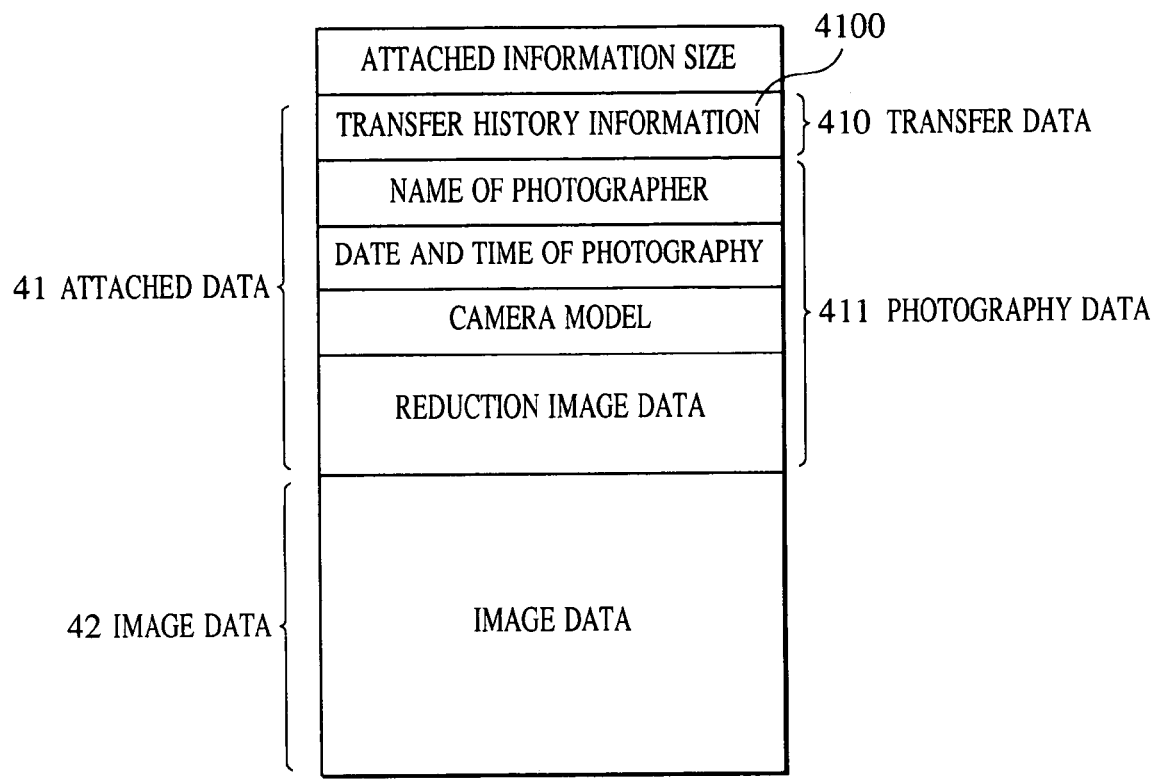
FIG. 5 is a diagram showing a method for storing transfer information history, according to the first embodiment.

FIG. 5 shows the internal configuration of the file according to the present embodiment. As shown in FIG. 5, the image file is generally divided into attached data 41 and image data 42. The attached data 41 contains transfer data 410 and photography data 411.

The transfer data 410 contains transfer history information 4100 indicating whether or not the file has been transferred to a PC or not.

The transfer history information 4100 is set to 1 in the event that the file has been transferred to a PC, and is set to 0 in the event that it has not been transferred.

The photography data 411 includes photography information such as the date and time of photography, shutter speed, etc., and these are automatically set at the time of photography with the digital camera.

Also, reduced image data is automatically generated by the digital camera by reducing the image size at the time of photography, and this is also included in the photography data. This reduced image data is used for previewing the images, and so forth.

Figure 6:
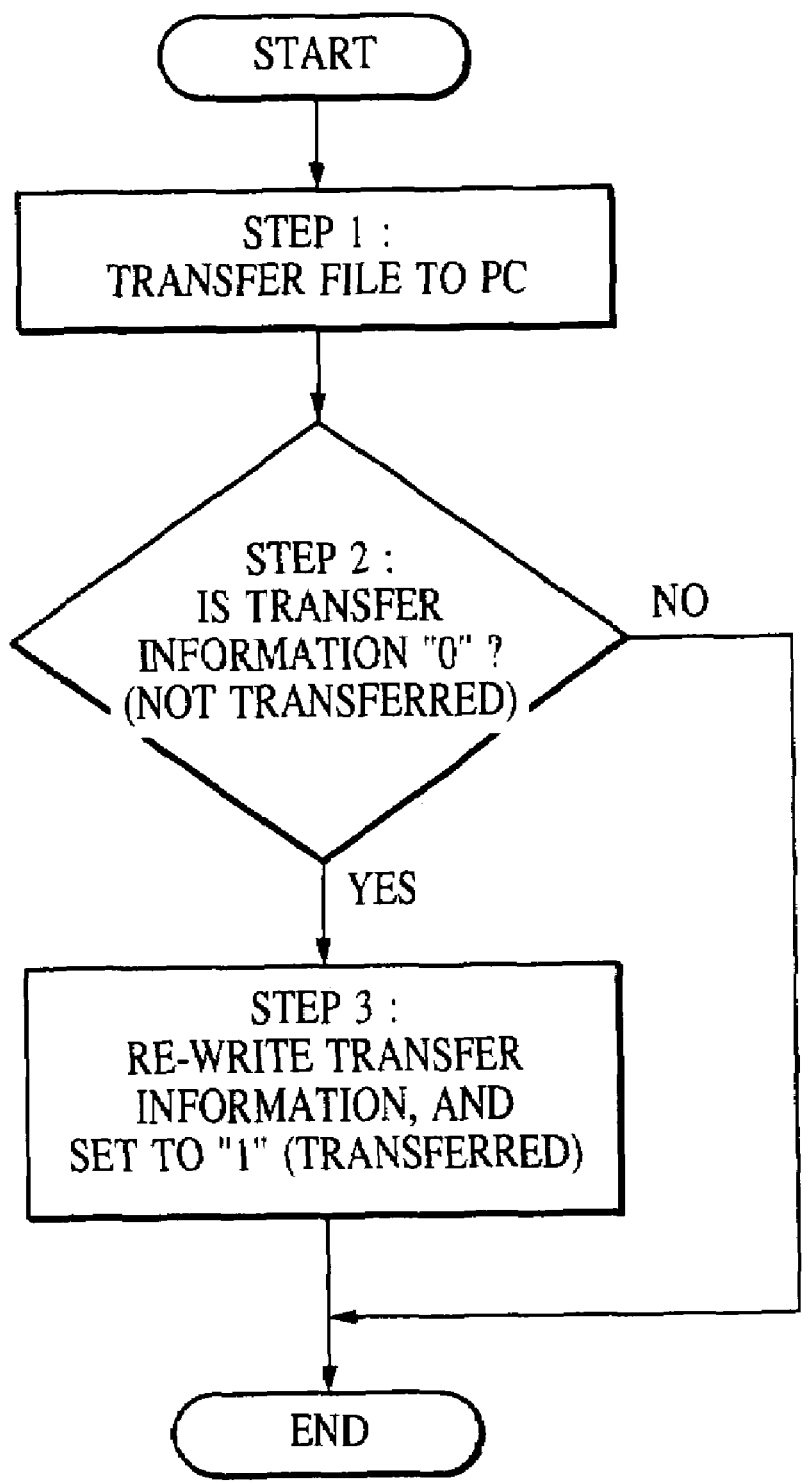
FIG. 6 is a flowchart showing the operation of the digital camera in the event that an image file is transmitted to a PC, according to the first embodiment.

FIG. 6 shows the operation of the digital camera according to the present embodiment transferring image files to the host application.

In the event that the digital camera receives an image request command from the host application, or in the event that image transfer is to be performed from the digital camera to the host application, first, at step 1, the desired image file is transmitted to the PC.

Next, in step 2, the transfer history information 4100 of the transmitted file is checked.

In the event that the transfer history information 4100 is set to 0 (not transferred), the flow proceeds to step 3, and rewrites the transfer history information 4100 for the file to 1 (transferred).

In the event that the transfer history information 4100 is not 0 in step 2, the processing ends here.

Figure 7:
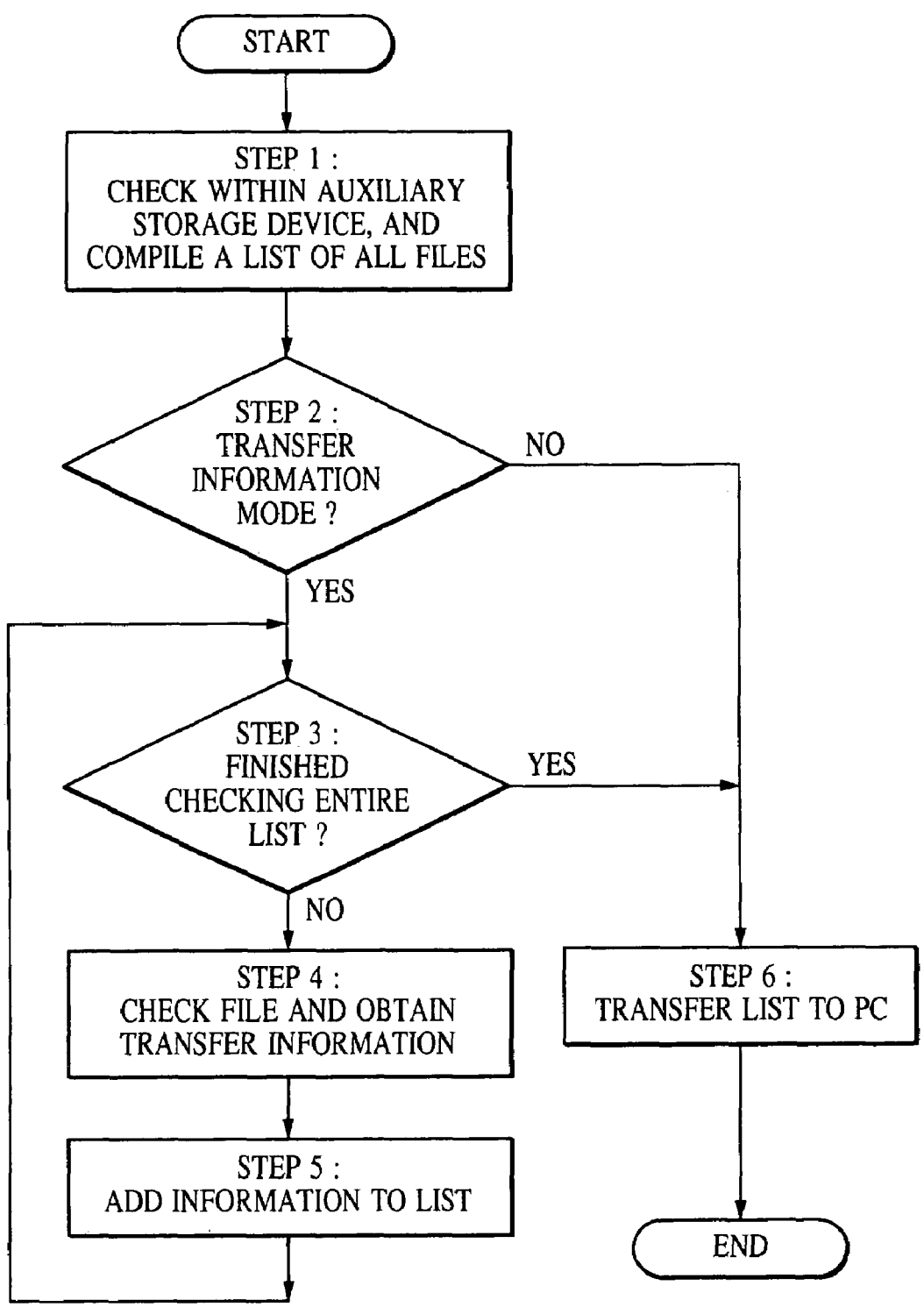
FIG. 7 is a flowchart showing the operation of the digital camera in the event that a file list is requested, according to the first embodiment.

Next, description will be made regarding the operation of the digital camera according to the present embodiment in the event that the digital camera receives a file list request command from the host application, with reference to the flowchart in FIG. 7.

A file list request command is for requesting a list of the path names to all image files stored in the auxiliary storing device of the digital camera.

First, in step 1, the auxiliary storing device of the digital camera is checked, and a list is created of the file paths for each image.

Next, in step 2, the transfer information mode is checked.

Here, the transfer information mode is specified as an argument of the file list request command, and specifies whether or not to request the transfer history information for the files, in addition to the path list to the files.

In the event that the transfer information mode is a mode wherein the transfer history information for the files is also necessary, the flow moves to step 3.

Conversely, in the event that the mode only requests the path list to all image files, the file path list created in step 1 is transferred to the host PC in step 6.

In step 3, whether or not the processing from step 4 on has been performed regarding all components of the list created in step 1 is checked, and in the event that there are components remaining, the flow proceeds to step 4.

In step 4, the file is opened and the transfer history information is obtained.

In step 5, the transfer history information obtained in step 4 is added to the list. Thus, the transfer history information for each file is added to the file path list transferred in step 6.

Next, the method of displaying the transfer history information on the liquid crystal screen of the digital camera according to the present embodiment will be described.

Figure 11:
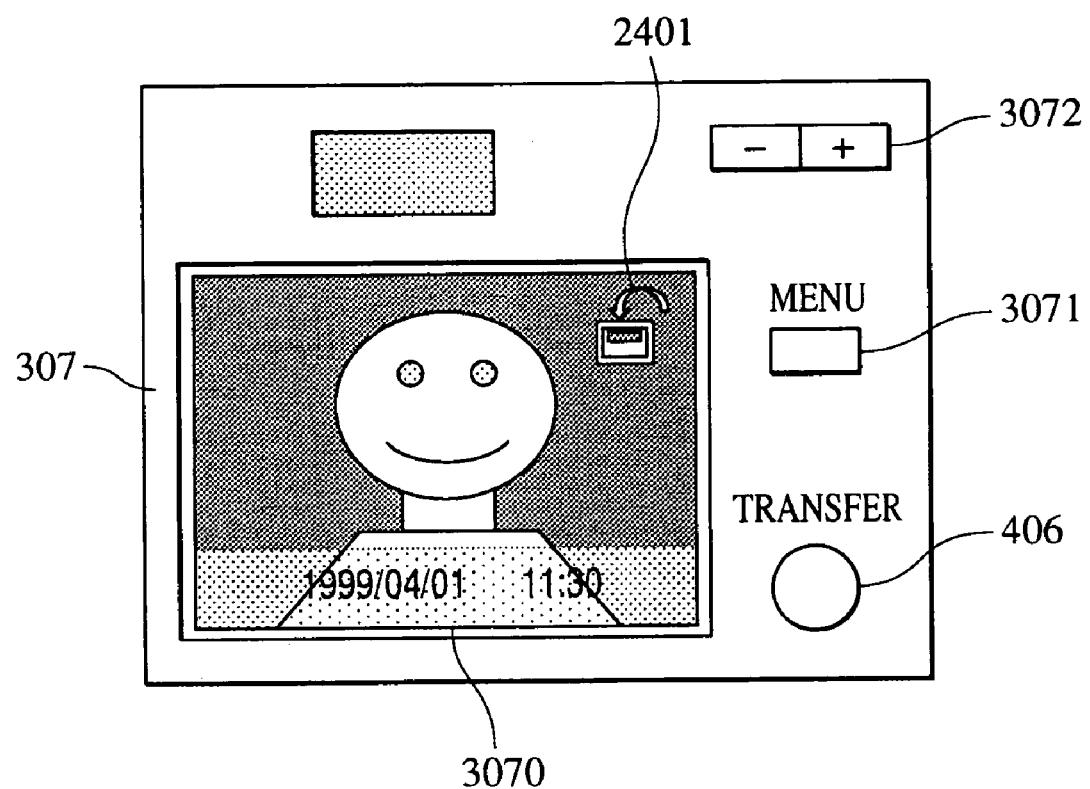
FIG. 11 is a method for displaying the transfer history with the digital camera, according to the first embodiment.

An example of display on the liquid crystal screen 3070 of the digital camera according to the present embodiment is shown in FIG. 11. FIG. 11 is a display example of an image which has already been captured by an application.

With the present embodiment, a captured mark 2401 is displayed in the upper right corner of the image, in the event that the image has already been captured. Thus, judgement can be made regarding whether each image is being managed by the application or not.

Figure 12:
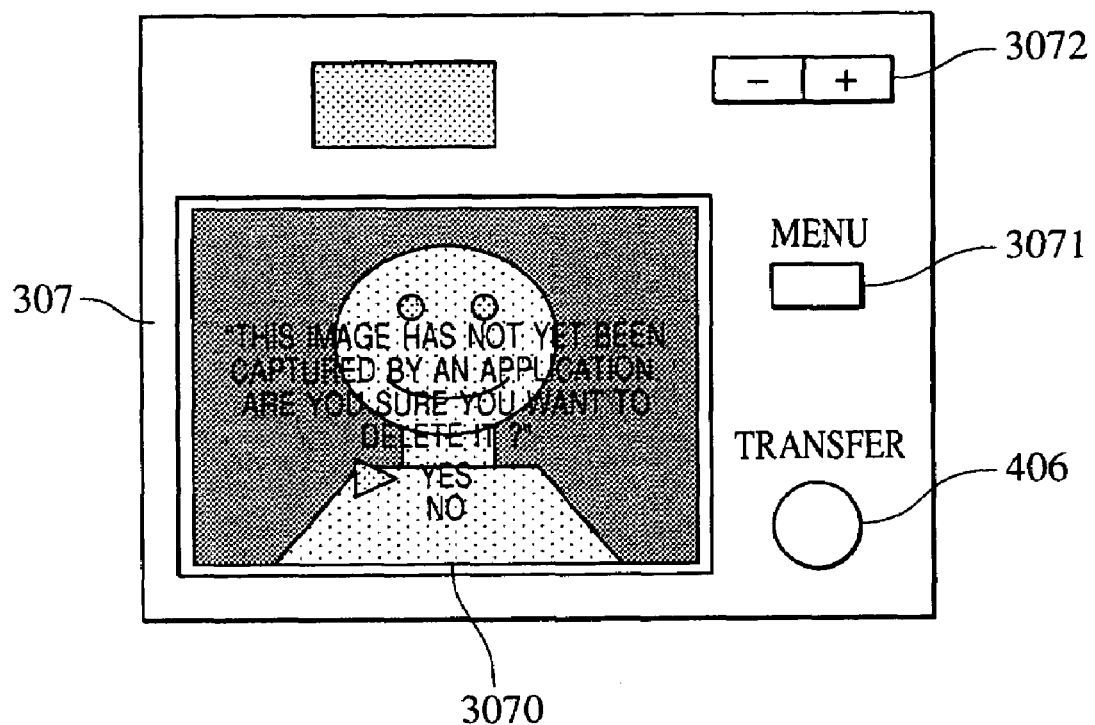
FIG. 12 is a display method for the digital camera in the event of attempting to delete images not transferred, according to the first embodiment.

Also, in the event that the user attempts to delete an uncaptured image, i.e., an image not provided with a captured mark, by operating the menu of the digital camera, a warning text such as shown in FIG. 12 is displayed with the digital camera according to the present embodiment.

Thus, uncaptured images, i.e., images not managed by the host application, can be prevented from being carelessly deleted.

Next, the host application according to the present embodiment will be described.

Figure 13:
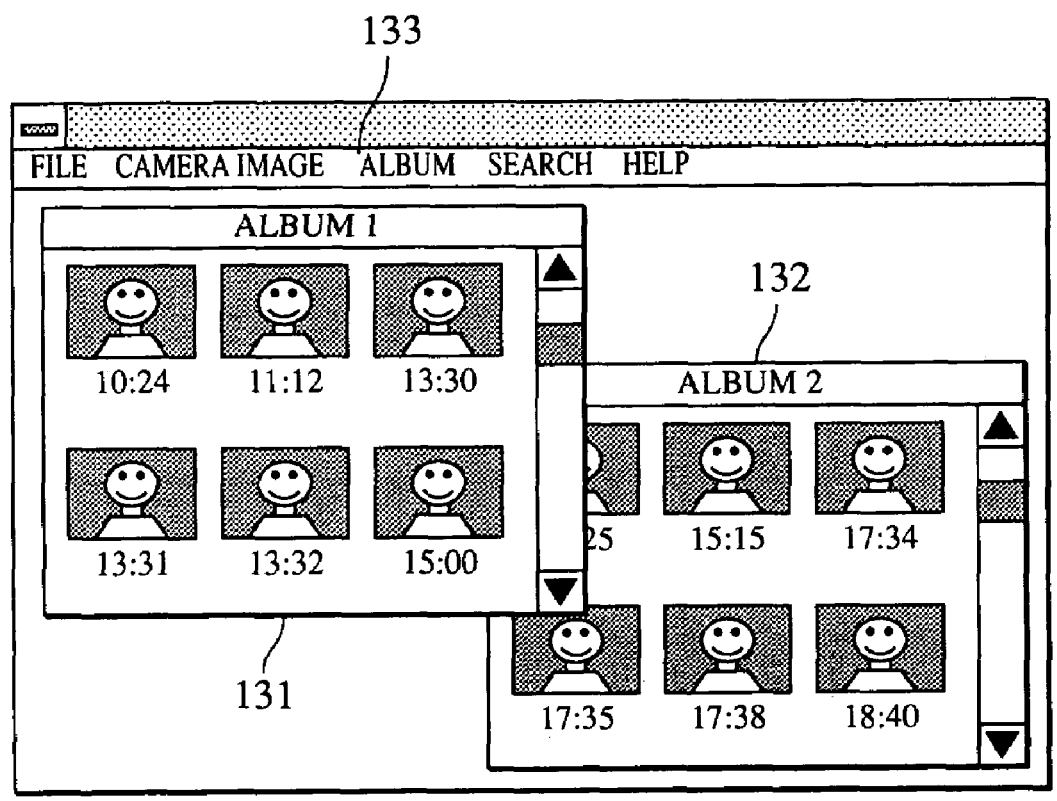
FIG. 13 is a diagram showing the host application of the digital camera, according to the first embodiment.

FIG. 13 shows a display screen of the host application managing and storing the images, which runs on the PC, according to the present embodiment.

With the present application, as shown in FIG. 13, images are grouped in units of albums 131, 132, and so forth and thus managed and displayed.

Figure 14:
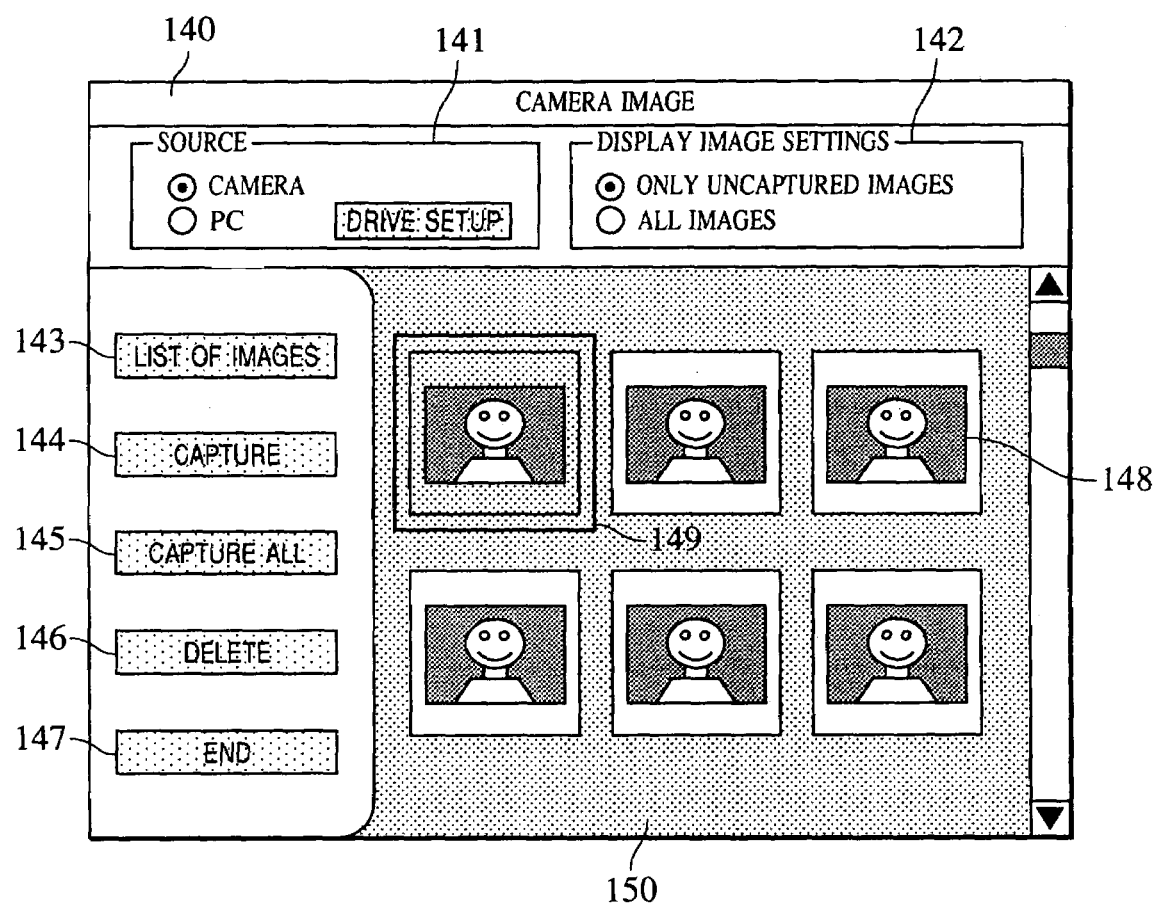
FIG. 14 is a diagram showing the camera image display screen with the host application, according to the first embodiment.

In the event of registering data newly taken with the camera to an album, the [Camera image] menu 133 is selected, and the camera image screen 140 shown in FIG. 14 is displayed.

The camera image display screen is for viewing a list of images stored in the auxiliary storing device of the camera, and reduced images 148 of the taken images are displayed.

Incidentally, reduced images are automatically created separately from the main image, at the time of photography with the digital camera.

The option in the [Display image settings] 142 on the camera image screen allows setting of either displaying only images not transferred yet, or displaying all images.

The option in the [Source] 141 is for setting the source of the image to be read in, and sets whether to display images recorded in the auxiliary storing device of the digital camera connected with a USB cable, or to display images stored in the auxiliary memory of the PC.

Incidentally, the digital camera used in the embodiment of the present invention uses a CF card (compact flash card) as the auxiliary storing device, and so in the event that the CF card is removed from the camera and set in a CF card reader connected to the PC, the option "PC" is selected from the [Source] 142, and the drive appropriated to the CF card reader is selected from the drive selection.

The [Image list] button 143 is for displaying reduced images of the image data take with the digital camera in the reduced image display area 150, according to the settings in the options [Display image settings] and [Source].

In the event that the main images corresponding to the displayed reduced images are to be registered to the album in the host application, and managed and stored, either the reduced image is dragged-and-dropped to the album, or a desired image is selected and then the capture button 144 is selected, whereby the main image is loaded from the auxiliary storing device of the camera or PC to the application, and the image is registered to the album.

In the present embodiment, in the event that [Display image settings] 142 is set to "Only uncaptured images" and the [Image list] 143 button is pressed in this state, the host application transmits a file list request command to the digital camera with the transfer information mode on.

The list consequently obtained has transfer information added to the path and file name of each of the files, so the application makes reference to the obtained list, sequentially issues reduced image request commands which are commands for obtaining reduced image data to the digital camera for only the images not transferred, and displays the obtained reduced images 148 on the reduced image display area 150, as shown in FIG. 14.

Thus, the images not transferred, inside the digital camera, alone are displayed on the reduced image display area 150.

Figure 15:
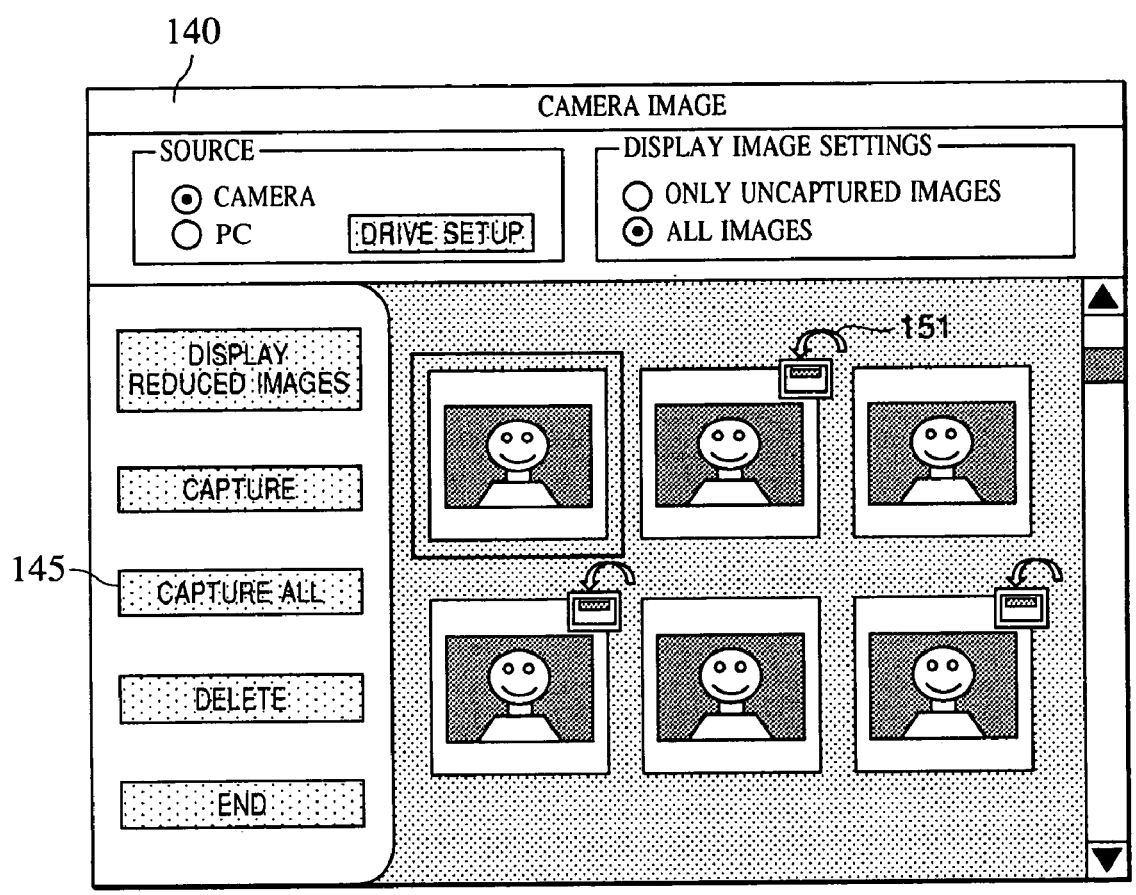
FIG. 15 is another diagram showing the camera image display screen with the host application, according to the first embodiment.

On the other hand, in the event that the [Display image settings] 142 option is set to "All images", the host application according to the present embodiment attaches transferred marks 151 to the transferred images as shown in FIG. 15, thereby differentiating from the images not transferred.

Accordingly, in this case, following obtaining the file list with the file list request command having the transfer information mode set to on, the list is referred to, reduced image request commands are issued sequentially to the digital camera for all files, thereby obtaining the reduced images.

In the event of displaying these, the transfer information in the file list is referred to, and in the event that the image has been transferred, display thereof is made along with the transferred mark 151 shown in FIG. 15.

Thus, whether or not the image files are registered to the host application or not can be easily discerned.

Figure 16:
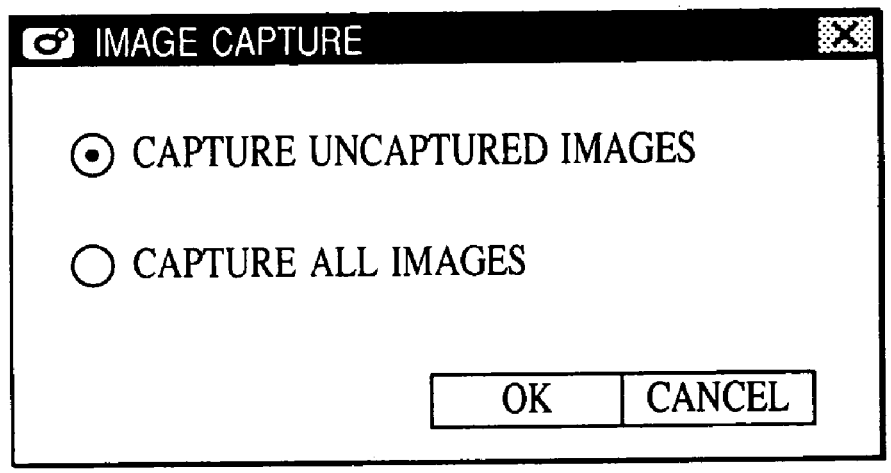
FIG. 16 is a display screen with the host application, according to the first embodiment.

Also, in the event that the Capture all button 145 is pressed in this state, the screen shown in FIG. 16 is displayed, and selection can be made whether to capture all images outside of the main unit corresponding to the displayed reduced images, or to capture only uncaptured images.

Figure 17:
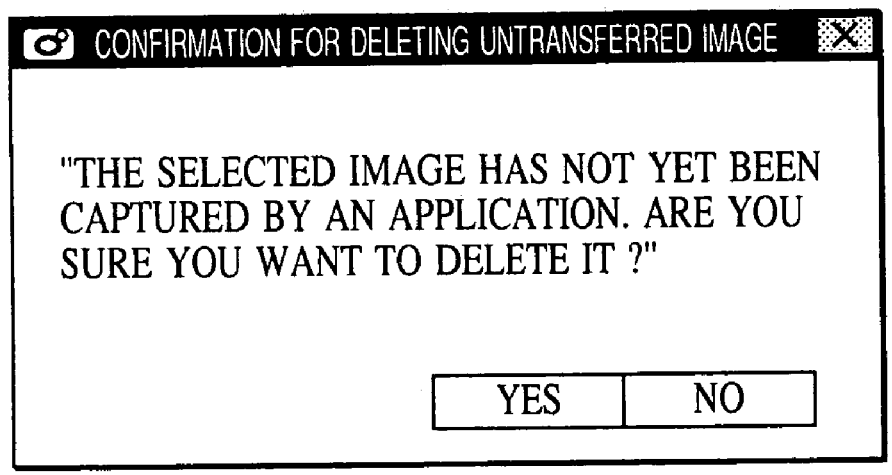
FIG. 17 is another display screen with the host application, according to the first embodiment.

Also, in the event of deleting an image in each state, the transfer information of the image is referred to, and in the event that the image is an image not transferred, the screen shown in FIG. 17 is displayed, and a warning message is shown to the user. Thus, images not registered to the host application can be prevented from being carelessly deleted.

Incidentally, in the above-described arrangement, selection can be made between capturing all images and capturing images not transferred, but an arrangement may be made with a mode wherein images which the user desires to capture can be selected and only the selected image is captured, so that selection is made with a mode for capturing images not transferred, thereby allowing the desires of the user to capture only desired images from the images not transferred to be dealt with in a flexible manner.

Next, an embodiment wherein auto-transfer is performed from the camera will be described.

At the point that the camera and the PC are connected, or at the time that the transfer button 406 of the digital camera is pressed with the camera and the PC being connected, the digital camera and host application according to the present embodiment having functions for automatically transferring the image files within the camera to the PC, and automatically recording and managing the image files with the host application on the PC.

Figure 18:
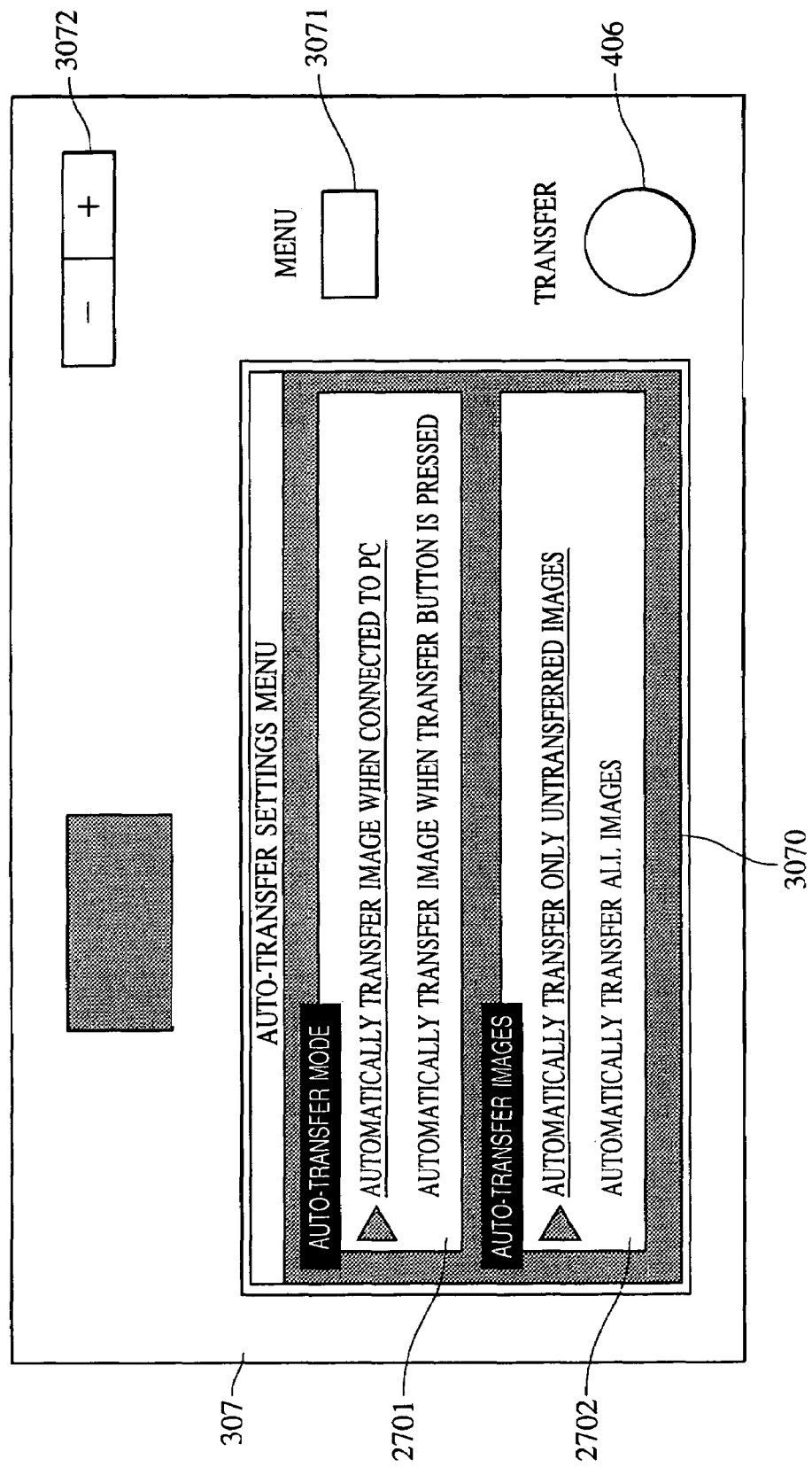
FIG. 18 is a setting screen for auto-transfer with the digital camera, according to the first embodiment.

FIG. 18 illustrates the manner in which the auto-transfer setting menu of the digital camera is displayed on the liquid crystal screen 3070.

The auto-transfer mode settings 2701 specifies the timing at which auto-transfer is performed, and specifies either the point that the digital camera and the PC are connected via USB cable, or the point that the transfer button 406 of the digital camera is pressed.

The auto-transfer image settings 2702 is for setting the type of image files to be auto-transferred, and specifies whether only images not transferred are to be auto-transferred to the PC, out of the image files stored in the auxiliary storing device of the digital camera, or whether all images are to be auto-transferred.

Figure 19:
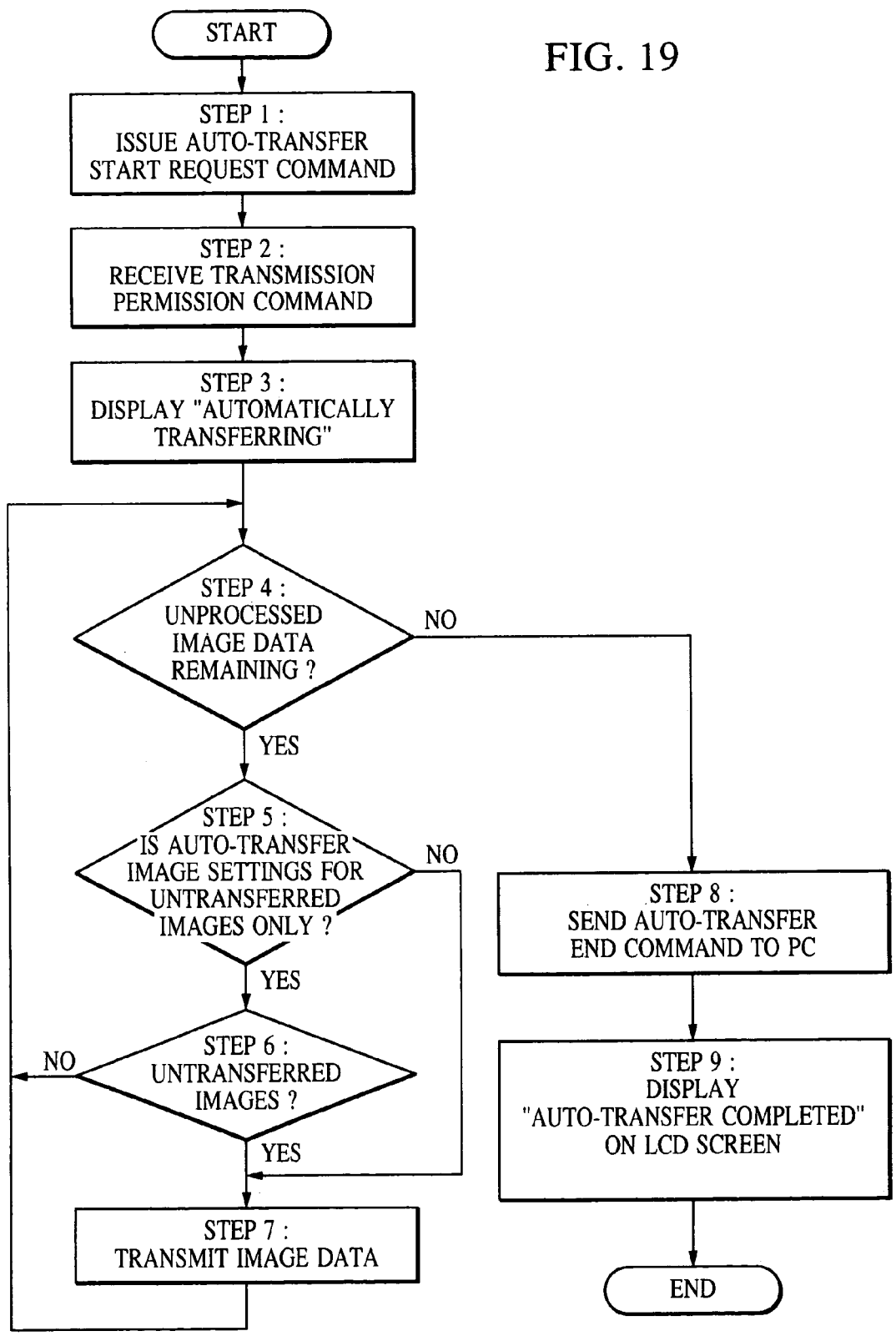
FIG. 19 is a flowchart illustrating the operation of auto-transfer from the digital camera to the host application, according to the first embodiment.

FIG. 19 shows the operation of the camera at the time of auto-transfer. The processing in FIG. 19 is executed at the timing specified by the auto-transfer mode settings 2701.

In FIG. 19, first, in step 1, a data transfer start request command is issued from the digital camera to the host PC.

At the host PC, this command causes the input/output device command monitoring system to activate the host application for the digital camera set beforehand.

The host application, upon being properly activated and preparation for data reception being completed, issues a transfer permission command to the digital camera.

The digital camera waits at step 2 for this transfer permission command to arrive.

Once this transfer permission command is received, at step 3 the digital camera displays "automatically transferring" on the liquid crystal display screen.

In step 4, checking is made regarding whether there are image files existing for which the processing of step 5 on has not been performed.

In the event that there is image data not transferred to the PC yet, the flow proceeds to step 5.

In step 5, the processing splits according to the auto-transfer image settings. In the event that the auto-transfer image settings specifies only images not transferred, the flow proceeds to step 6. On the other hand, in the event that the auto-transfer image settings specifies all images, the flow proceeds to step 7, and the image data is transmitted to the PC.

In step 6, the transfer information of the file to be processed is checked, and in the event that the file has not been transferred, data transfer to the host PC is performed.

At this time, the application on the PC which has been activated in step 2 automatically manages and saves the image data from the digital camera.

Once processing for all image data is completed in step 4, a transfer completed command is set to the PC in step 8.

In step 9, "auto-transfer completed" is displayed on the on the liquid crystal screen of the camera, indicating that the series of processing is completed.

Thus, the host application can be prevented from managing one piece of image data doubly, even in the event that auto-transfer from a digital camera is used to automatically record and manage images with a system made up of a digital camera and a host application for storing and managing images.

According to the above configuration, transfer of the same image can be prevented, while at the same time realizing image transfer of images not transferred in a manner very handy to the user.

Also, this arrangement is provided with a mode wherein the images which the user desires to transfer can be selected, which can be switched over to and from a mode wherein all images not transferred can be batch transferred, so even in the event that there are images in the images not transferred regarding which the user does not desire transfer of, this can be dealt with sufficiently.

Further, display of only images not transferred can be performed as well, so even in the event that there are many images already transferred stored in the storing medium, only the images to be transferred can be easily recognized.

Incidentally, generally, the computation processing capabilities of the host computer exceed the computation processing capabilities of the digital camera, so the image capturing with the internal computation processing of the host computer is fast, but even in the event that computation processing of some sort is being performed, control can be made from the digital camera to transfer the images to the host computer, which increases the load on the digital camera but also reduces the load on the host computer.

That is to say, the computation processing capabilities of the camera can be used to facilitate ease of transfer of images to the host computer.

Second Embodiment

With the second embodiment, a transfer history managing file for managing whether each image file has been transferred or not is created separately from the image files, thereby centrally managing the transfer history information of all files.

The equipment configuration according to the present embodiment does not differ in particular from that in the first embodiment.

With the present embodiment, once an image is transferred form the camera to the host PC, the path and file name of that file are added to the transfer history managing file. That is to say, the transfer history managing file has the path name of the transferred file.

Figure 8:
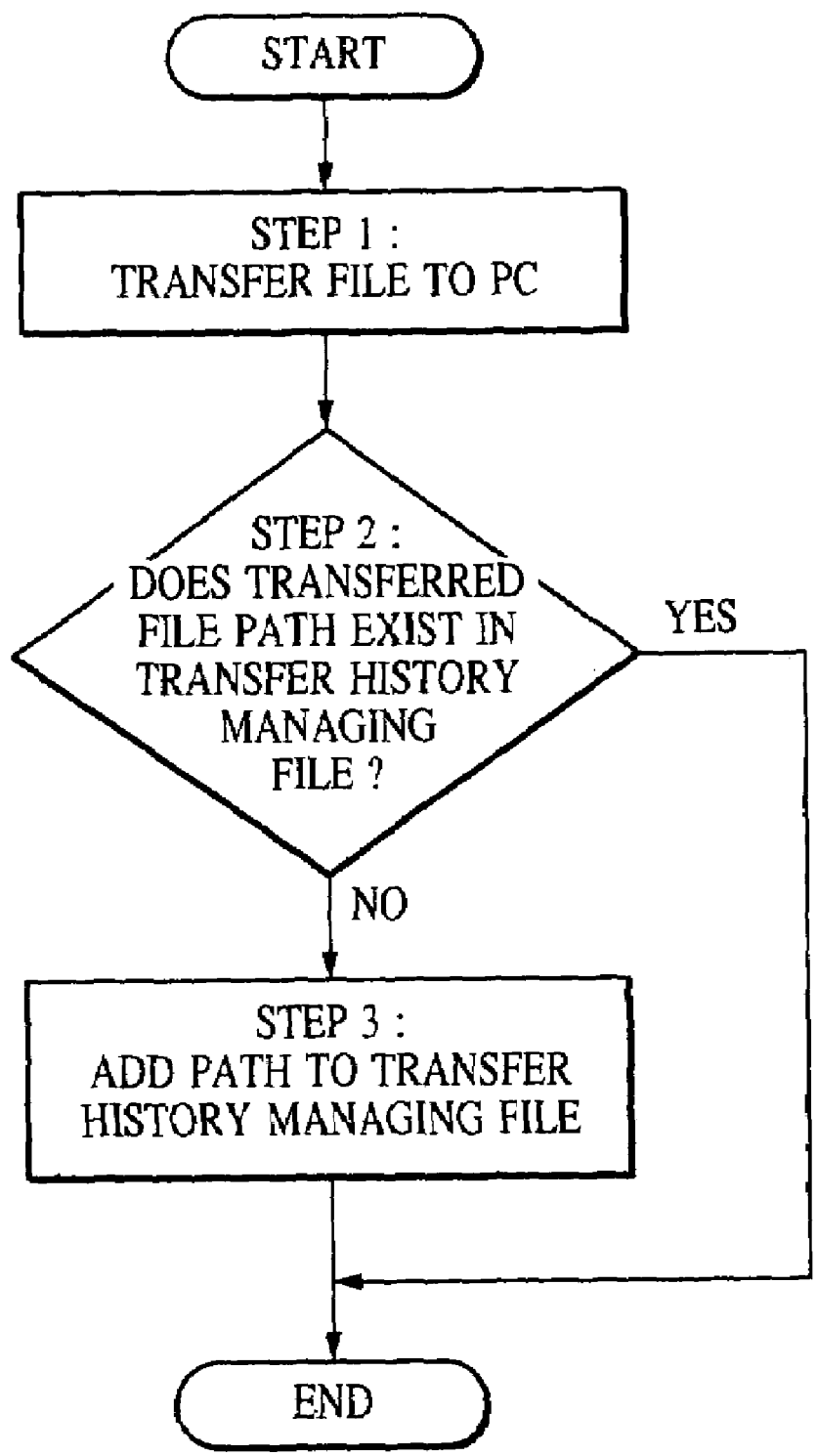
FIG. 8 is a flowchart showing the operation of the digital camera in the event that an image file is transmitted to a PC, according to a second embodiment.

FIG. 8 shows the operation of the digital camera at the time of transferring an image file from the digital camera to the host application, according to the present embodiment.

In the event that the digital camera receives an image request command from the host application, or in the event that image transfer is to be performed from the digital camera to the host application, first, in step 1, the desired image file is transferred to the PC.

Next, in step 2, the transfer history managing file is checked. In the event that the path name of the file transferred in step 1 does not exist in the transfer history managing file, the flow proceeds to step 3, and adds the path name of the transferred file to the transfer history managing file.

Next, the transfer history managing file is checked in step 2.

In the event that the path name already exists in the transfer history managing file, the processing ends here.

Also, with the present embodiment, there is the need to check the transfer history managing file in the case that an image has been deleted as well, and update as necessary.

That is because, in the event that a new file is added with the same file name following deletion of the file which has the path thereof described in the transfer history managing file, there will be problems in that the file is in the transfer history managing file even though not transferred yet.

Figure 9:
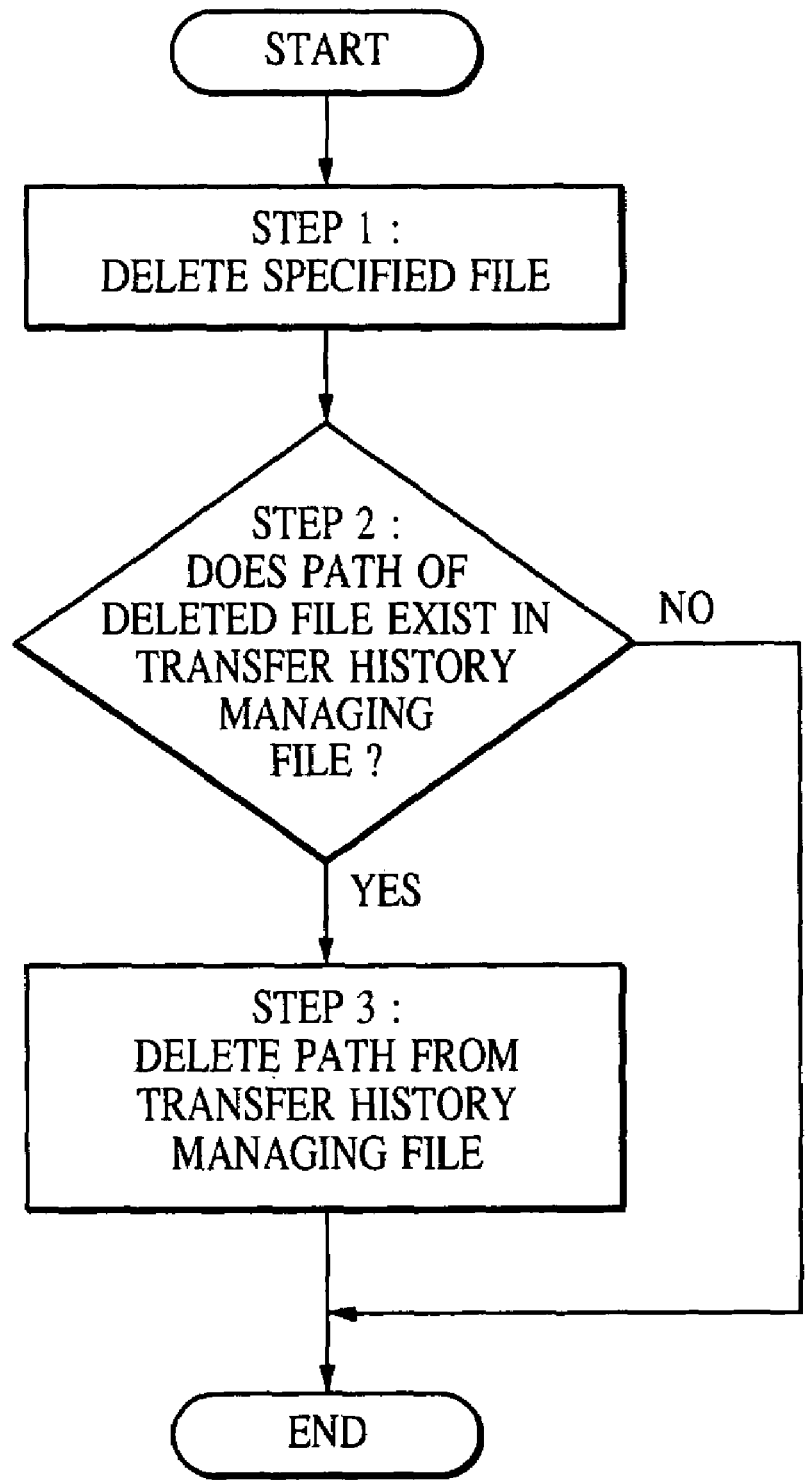
FIG. 9 is a flowchart showing the operation of the digital camera in the event that an image file is deleted, according to the second embodiment.

In order to prevent this, with the present embodiment, the operation shown in FIG. 9 is performed at the time of deleting images.

In step 1 in FIG. 9, a desired image is deleted, and in step 2, a check is made to see whether or not the path of the deleted file exists in the transfer history managing file.

In the event that the path is described therein, the flow proceeds to step 3, and the contents of the transfer history managing file are changed in order to delete the path name of the deleted file.

Next, the operation of the camera at the point that the digital camera receives a file list request command from the host application according to the second embodiment will be described with reference to the flowchart shown in FIG. 10.

First in step 1, a check is performed within the auxiliary storing device of the camera, and a path list is created for all image files.

Next, in step 2, the transfer information mode is checked. In the event that the transfer information mode is a mode which requires transfer history information as well, the flow proceeds to step 3. Otherwise, i.e., in the event that the request is only for a path list to all image files, the file path list created in step 1 is transferred to the host PC in step 7.

In step 3, a check is made of the items in the list created in step 1, regarding whether the processing of step 4 on has been performed, and in the event that there are items remaining, the flow proceeds to step 4. In step 4, reference is made to the transfer history managing file, to check whether the same file path as an item in the list exists therein.

In the event that the same path is discovered, "Transferred" is added in step 5 as corresponding file information in the file path list created in step 1. On the other hand, in the event that the same file path is not discovered in step 4, "Not transferred" is added to the file path list. Thus, file transfer information is added to the file path list transferred in step 7.

Figure 10:
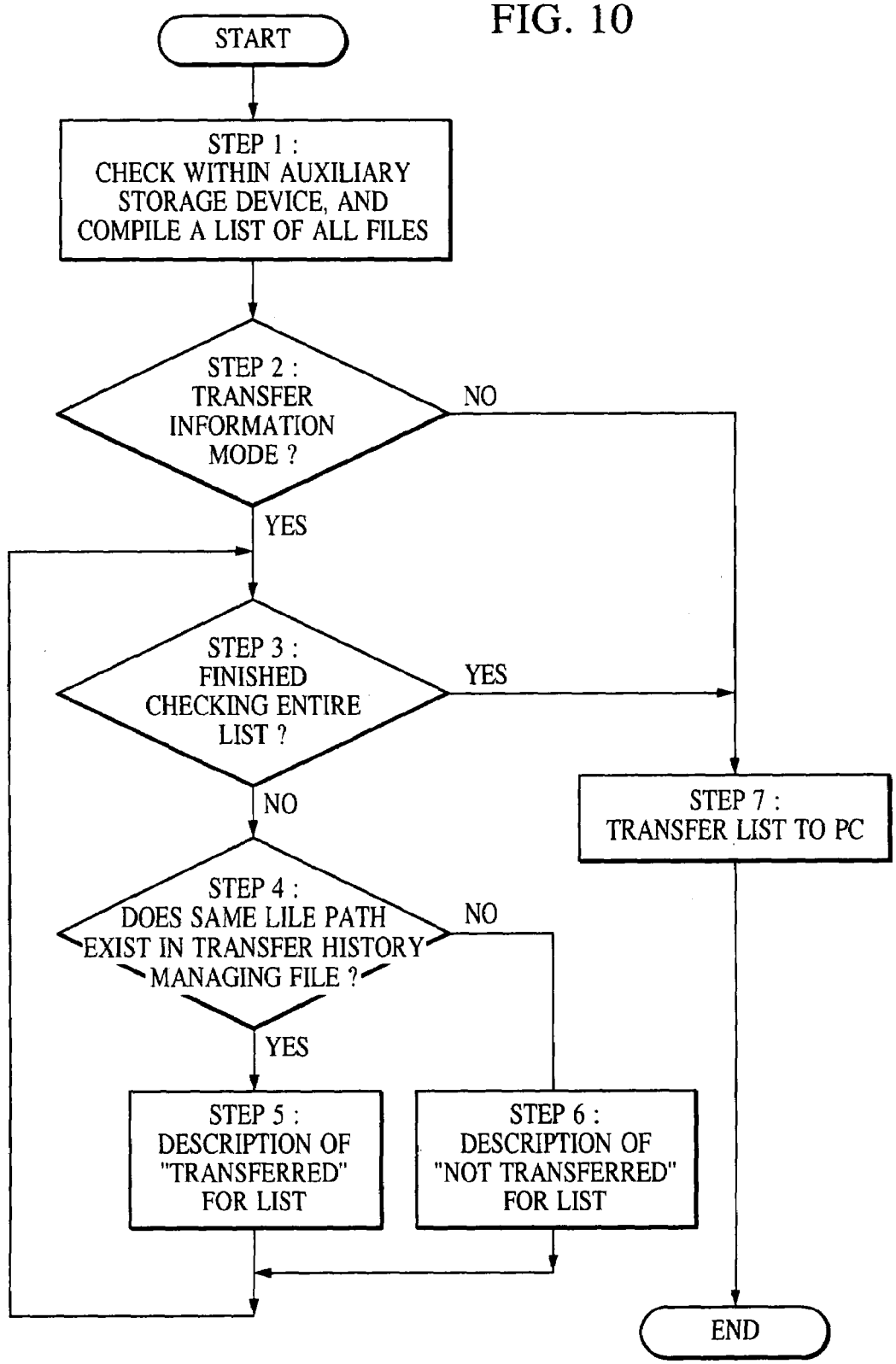
FIG. 10 is a flowchart showing the operation of the digital camera in the event that a file list is requested, according to the second embodiment.

As described above, the transfer history information is managed with a file separate from the image data, so that the transfer history information can be obtained by checking the file storing the transfer history information without checking all images stored in the storing medium, as shown in FIG. 10, thereby improving the speed of processing.

Incidentally, an arrangement may be made wherein the file paths of all images stored in the storing medium are stored in the transfer history managing file, and the image transfer history information is updated an managed each time a transfer operation is made, whereby operations which make reference to the transfer history such as capturing transferred images or finding out the file path list for images not transferred, can be performed speedily.

Third Embodiment

Another display form on the camera display screen with the host application will be described according to the present embodiment.

The equipment configuration according to the present embodiment does not differ in particular from that in the first embodiment.

Figure 20:
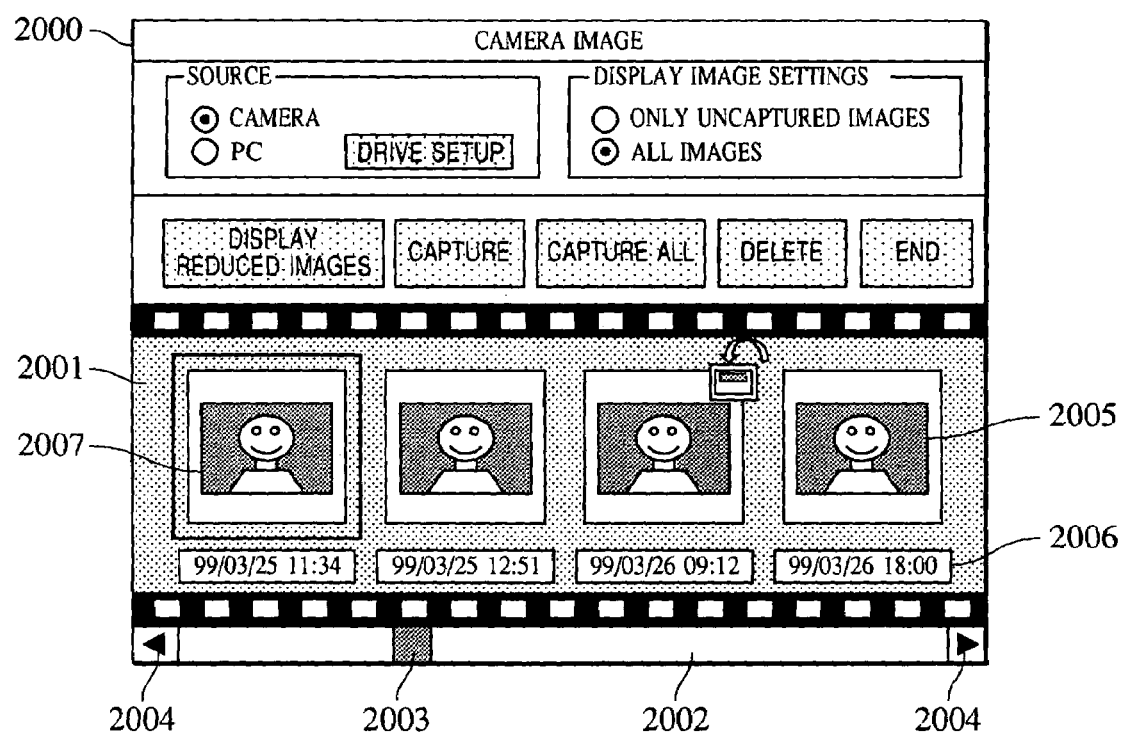
FIG. 20 is a diagram showing the camera image display screen with the host application, according to a third embodiment.

FIG. 20 shows the camera image screen of the different display format.

With the present display format, reduced images are displayed in the reduced image display area 2001, in order of old photography dates to recent photography dates, from the left to the right.

In the event of displaying reduced images of even older or newer photography dates, the scroll box 2003 of the scroll bar 2002 is moved, or the scroll box moving button 2004 is pressed, thereby scrolling the reduced images displayed in the reduced image display area 2001.

With the present embodiment, in the event that the reduced image display button is pressed in the state of the display images settings set to "All images", the initial state of the reduced image display area 2001 is set to a state wherein the reduced image 2007 corresponding to the oldest image in the camera not transferred is displayed at the leftmost portion of the reduced image display area, i.e., automatically scrolled to that position.

That is to say, all images which should be located to the left of the reduced image 2007 are images which have already been captured.

Figure 21:
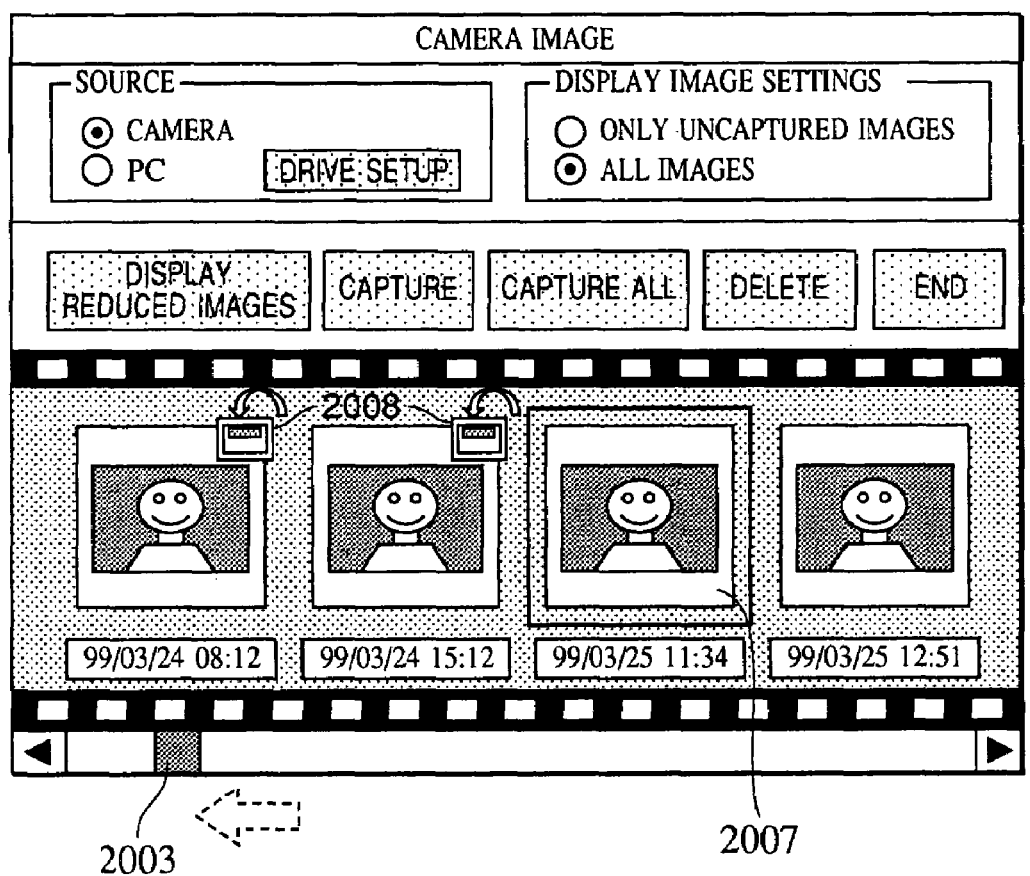
FIG. 21 is a diagram showing the camera image display screen with the host application, according to the first embodiment.

For example, FIG. 21 shows an example wherein the scroll box 2003 is moved to the left from the state shown in FIG. 20 so that older images are displayed in the reduced image display area.

Looking at FIG. 21, we can see that all images displayed to the left of the reduced image 2007, i.e., older than the reduced image 2007, have the captured mark 2008 attached thereto.

Thus, scrolling the initial state so that an uncaptured reduced image comes to the top of the display area reduces the trouble of searching for uncaptured images, even in the event that all images are displayed.

As described above, making reference to the transfer history information and changing the display order of the images on the display screen yields advantages such as facilitating ease of searching for only images not transferred.

It is needless to say that the present invention can be applied to both cases wherein images are transferred and cases wherein images are captured. That is to say, in the event that the computer and digital camera are connected as with the embodiments, either device may be the transferring side or capturing side. Further, ether device may be used for executing the transferring and capturing operations for the images.

Incidentally, in the embodiments, a transferred mark is attached to the transferred images and displayed, but the present invention is not restricted to such; rather, a mark may be attached to the images not transferred to indicate that the images have not been transferred.

Also, transferred images and images not transferred may be differentiated and displayed in separate areas.

Incidentally, the present invention may be applied to a system may up of multiple pieces of equipment (e.g., a host computer, interface device, reader, printer, etc.) or to an apparatus made up of a single piece of equipment (e.g., a photocopier, facsimile apparatus, etc.).

Also, an arrangement wherein software program code for realizing the functions of the embodiments is supplied to a device or a computer in the system connected to the device so as to operate the devices so as to realizing the functions of the above-described embodiments, and the devices are operated according to the programs stored in the computer of the system or the device (i.e., a CPU or MPU), is within the scope of the present invention.

Also, in this case, the software program code itself realizes the functions of the embodiments, and the program code itself, and means for supplying the program code to the computer, such as a storing medium for storing the program code, make up the present invention.

Examples of storing mediums which can be used for storing the program code include floppy disks, hard disks, optical disks, magneto-optical disks, CD-ROMs, magnetic tape, non-volatile memory cards, ROM, and so forth.

Also, it is needless to say that not only in the event the computer executing the supplied program code realizes the functions of the above embodiments, but also in the event that the program code operates in cooperation with the operating system running on the computer or in cooperation with other application software or the like so that the functions of the above embodiments are realized, the program code is included in the embodiments of the present invention.

Further, it is needless to say that the scope of the present invention also encompasses arrangements wherein the supplied program code is stored in memory provided to function expansion boards of the computer or to function expansion units connected to the computer, following which a CPU or the like provided to the function expansion boards or function storing units performs all or part of the actual processing based on instructions of the program code, so as to realize the functions of the above embodiments.

As described above, according to the present invention, images not transferred can be transferred or captured in batch, so an image processing apparatus, image processing method, and storing medium can be provided wherein transfer or capture of the same image is prevented, and at the same time is very handy for the user.

Also, switching can be arbitrarily performed between a mode wherein images which the user desires to transfer or capture are selected and the selected images are transferred or captured, and a mode wherein batch transfer or capture is performed for images not transferred to other apparatuses, so transferring or capturing of selecting images can be dealt with in a flexible manner.

Also, the order of displaying images can be changed according to the transfer history information, so display can be performed taking the transfer history into consideration. For example, transferred images may be all displayed, images not transferred may be all displayed, and so forth.

Thus, for example, ease of selecting the images to be further transferred from the images not transferred can be facilitated, confirmation can be made of only transferred images, and so forth.

Also, displaying only images not transferred facilitates ease of recognizing images not transferred. Thus, for example, ease of selecting the images to be further transferred from the images not transferred, can be facilitated.

Also, the transfer history information is recorded in a file separate from the image, thereby allowing only transfer history information to be obtained speedily.

Also, transfer history information corresponding to an image to be deleted is deleted according to deletion of the image, so situations can be prevented wherein the data of images already deleted remains in the file storing the transfer history information. That is, situations can be prevented wherein the transfer history information and the stored images do not match at the time of reading actual images using the transfer history.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image transferring apparatus, comprising:
    a storage unit, adapted to store image data;
    an image data transfer instruction unit, which includes a button for instructing image data transfer, adapted to enable a user to enter an instruction to transfer the image data;
    a display unit, adapted to display a first screen to enable a user to select between (1) automatically selecting and transferring only image data stored in said storage unit that have has not previously been transferred and (2) automatically selecting and transferring all image data stored in said storage unit, and to display a second screen to enable a user to select between (1) automatically transferring image data in response to connecting said image transferring apparatus to another apparatus and (2) automatically transferring image data in response to an instruction to transfer entered by the user with said image data transfer instruction unit; and a transfer control unit, adapted to perform control to automatically transfer the image data, and (1) to judge a selection selected from the first screen displayed by said display unit, and if the selection to automatically select and transfer only image data stored in said storage unit that have not previously been transferred is made, perform control to automatically select and transfer only the image data stored in said storage unit that have not previously been transferred based on transfer history information, and if the selection to automatically select and transfer all image data stored in the storage unit is made, perform control to automatically select and transfer all the image data stored in said storage unit regardless of the transfer history information and (2) to judge a selection selected from the second screen displayed by said display unit, and if the selection to automatically transfer image data in response to connecting said image transferring apparatus to the other apparatus is made, perform control to automatically transfer image data in response to connecting said image transferring apparatus to the other apparatus, and if the selection to automatically transfer image data in response to an instruction to transfer entered by the user with said image data transfer instruction unit is made, perform control to automatically transfer image data in response to an instruction to transfer entered by the user with said image data transfer instruction unit.

2. The image transferring apparatus according to claim 1, wherein said display unit comprises a liquid crystal display screen.

3. The image transferring apparatus according to claim 1, wherein said image data transfer instruction unit is provided separately from said display unit.

4. The image transferring apparatus according to claim 1, further comprising a notification unit, adapted to notify, after completion of image data transfer, of the completion.

5. The image transferring apparatus according to claim 1, further comprising a message notification unit, adapted to attach a message notification to the image data to make reference to the transfer history information, and an instruction to delete image data that have not been previously transferred.

6. The image transferring apparatus according to claim 1, wherein said display unit identifiably displays reduced image data corresponding to the transferred image data based on the transfer history information.

7. An image transferring method of transferring image data to an apparatus, comprising:

a storage step, of storing image data;

an image data transfer instruction step, of instructing to transfer the image data by using a button provided for the image data transfer instruction;

a display step, of displaying a first screen to enable a user to select between (1) automatically selecting and transferring only image data stored in said storage step that have not previously been transferred and (2) automatically selecting and transferring all image data stored in said storage step, and displaying a second screen to enable a user to select between (1) automatically transferring image data in response to connecting to the apparatus and (2) automatically transferring image data in response to an instruction to transfer entered by the user in said image data transfer instruction step; and a transfer control step, of performing control to automatically transfer the image data, and (1) to judge a selection selected from the first screen displayed in said display step, and if the selection to automatically select and transfer only image data stored in said storage step that have not previously been transferred is made, perform control to automatically select and transfer only the image data stored in said storage step that have not previously been transferred based on transfer history information, and if the selection to automatically select and transfer all image data stored in the storage step, is made, perform control to automatically select and transfer all the image data stored in said storage step regardless of the transfer history information, and (2) to judge a selection selected from the second screen displayed in said display step, and if the selection to automatically transfer image data in response to connecting to the apparatus is made, perform control to automatically transfer image data in response to connecting to the apparatus, and if the selection to automatically transfer image data in response to an instruction to transfer entered by the user in said image data transfer instruction step is made, perform control to automatically transfer image data in response to an instruction to transfer entered by the user in said image data transfer instruction step.

8. The image transferring method according to claim 7, further comprising a notification step, of notifying, after completion of image data transfer, of the completion.

9. The image transferring method according to claim 7, further comprising a message notification step, of attaching a message notification to the image data to make reference to the transfer history information, and an instruction to delete image data that have not been previously transferred.

10. The image transferring method according to claim 7, in which said display step includes identifiably displaying reduced image data corresponding to the transferred image data based on the transfer history information.

11. A storing medium, storing a computer-readable program for implementing an image transferring method of transferring image data to an apparatus, the method comprising:

a storage step, of storing image data;

an image data transfer instruction step, of instructing to transfer the image data by using a button provided for the image data transfer instruction;

a display step, of displaying a first screen to enable a user to select between (1) automatically selecting and transferring only image data stored in said storage step that have not previously been transferred and (2) automatically selecting and transferring all image data stored in said storage step, and displaying a second screen to enable a user to select between (1) automatically transferring image data in response to connecting to the apparatus and (2) automatically transferring image data in response to an instruction to transfer entered by the user in said image data transfer instruction step; and a transfer control step, of performing control to automatically transfer the image data, and (1) to judge a selection selected from the first screen displayed in said display step, and if the selection to automatically select and transfer only image data stored in said storage step that have not previously been transferred is made, perform control to automatically select and transfer only the image data stored in said storage step that have not previously been transferred based on transfer history information, and if the selection to automatically select and transfer all image data stored in the storage step, is made, perform control to automatically select and transfer all the image data stored in said storage step regardless of the transfer history information, and (2) to judge a selection selected from the second screen displayed in said display step, and if the selection to automatically transfer image data in response to connecting to the apparatus is made, perform control to automatically transfer image data in response to connecting to the apparatus, and if the selection to automatically transfer image data in response to an instruction to transfer entered by the user in said image data transfer instruction step is made, perform control to automatically transfer image data in response to an instruction to transfer entered by the user in said image data transfer instruction step.

12. The storing medium according to claim 11, further comprising a notification step, of notifying, after completion of image data transfer, of the completion.

13. The storing medium according to claim 11, further comprising a message notification step, of attaching a message notification to the image data to make reference to the transfer history information, and an instruction to delete image data that have not been previously transferred.

14. The storing medium according to claim 11, in which said display step includes identifiably displaying reduced image data corresponding to the transferred image data based on the transfer history information.

15. An image processing apparatus, comprising:
  a capturing unit adapted to capture a plurality of bodies of reduced image data corresponding to respective image data, and transfer history information of the image data, from a storage medium of at least one external device;
  a transfer unit, adapted to transfer image data stored in the storage medium;
  a display control unit, adapted to perform control so as to display the reduced image data captured by said capturing unit and control a display order of the plurality of bodies of reduced image data based on the transfer history information; and
  a screen display control unit, adapted to perform control so as to display a first screen to enable a user to select between (1) selecting only image data stored in the storage medium that have not previously been transferred and (2) selecting all image data stored in the storage medium, and a second screen to enable a user to select between (1) transferring image data in response to connecting said image processing apparatus to another apparatus and (2) transferring image data in response to an instruction to transfer entered by the user,
  wherein said screen display control unit is adapted to control so as to display, selectively, in response to selection made by the user with said screen display control unit, either (1) only any image data not previously transferred or (2) all image data stored in the storage medium,
  wherein said display control unit controls the display order of the plurality of bodies of reduced image data, based on the transfer history information, so that reduced image data corresponding to image data that have not been transferred are preferentially displayed among the reduced image data captured by the capturing unit.

16. The image processing apparatus according to claim 15, wherein said display control unit performs control so as to display identifiably the reduced image data corresponding to the transferred image data based on the transfer history information.

17. The image processing apparatus according to claim 15, wherein the screen displayed by said screen display control unit includes a screen which allows a user to select arbitrary image data.

18. The image processing apparatus according to claim 15, further comprising a message notification unit, adapted to notify the user by means of a warning message in the event that the transfer history information is referred to, and an instruction to delete the image data not previously transferred is made.

19. The image processing apparatus according to claim 15, wherein, in a case where all image data stored in the storage medium is selected in the first screen so as to be automatically transferred, the display control unit controls the display order of the plurality of reduces image data, based on the transfer history information, so that reduced image data corresponding to image data that have not been transferred is preferentially displayed among the plurality of bodies of reduced image data captured by the capturing unit.

20. The image processing apparatus according to claim 15, wherein the display control unit further controls the display order of the plurality of bodies of reduced image data so that reduced image data corresponding to image data having an image capturing date older than an image capturing date of other image data is preferentially displayed.

21. A storing medium, storing a computer-readable program for implementing an image processing method of transferring image data to an apparatus, the method comprising:
  a capturing step, of capturing a plurality of bodies of reduced image corresponding to respective image data, and transferring history information of the image data from a storage unit of at least one external device;
  a transfer step, of transferring image data stored in the storage unit;
  a display control step, of performing control so as to display the reduced image data captured in said capturing step and control a display order of the plurality of bodies of reduced image data based on the transfer history information; and
  a screen display control step, of performing control so as to display a first screen to enable a user to select between (1) selecting only image data stored in the storage unit that have not previously been transferred and (2) selecting all image data stored in the storage unit, and a second screen to enable a user to select between (1) transferring image data in response to connecting to the apparatus and (2) transferring image data in response to an instruction to transfer entered by the user,
  wherein the screen display control includes controlling so as to display, selectively, in response to selection made by the user in said screen display control step, either (1) only any image data not previously transferred or (2) all image data stored in the storage medium,
  in which said display control step controls the display order of the plurality of bodies of reduced image data based on the transfer history information, so that reduced image data corresponding to image data that have not been transferred are preferentially displayed among the reduced image data captured by the capturing unit.

22. The storing medium according to claim 21, in which said display control step includes performing control so as to display identifiably the reduced image data corresponding to the transferred image data based on the transfer history information.

23. The storing medium according to claim 21, in which the screen displayed in said screen display control step includes a screen which allows a user to select arbitrary image data.

24. The storing medium according to claim 21, further comprising a message notification step, of notifying the user by means of a warning message in the event that the transfer history information is referred to, and an instruction to delete the image data not previously transferred is made.

* * * * *